United States Patent Office 3,155,712
Patented Nov. 3, 1964

3,155,712
CYANATED DI-p-XYLYLENES
Ying L. Yeh, Highland Park, N.J., assignor to Union
Carbide Corporation, a corporation of New York
No Drawing. Filed Mar. 1, 1962, Ser. No. 176,803
2 Claims. (Cl. 260—465)

This invention relates to polysubstituted cyclic di-p-xylylenes, and to a process for making the same, and more particularly to polycyanated cyclic di-p-xylylenes having up to 6 cyano groups substituted on the aromatic nuclei.

Cyanation of aliphatic and aromatic compounds are well established chemical procedures. The substitution methods and the limitations imposed thereon are known and well defined. Conventionally, aliphatic nitriles are prepared by heating alkyl halides in contact with a suitable cyanide in a solvent for both reactants, generally aqueous alcohol. Aromatic nitriles, however, are made, not from the unreactive aryl halides, but quite often from diazonium salts of the aromatic compound. In general, aryl halides are quite unreactive toward the nucleophillic substitution reactions so characteristic of the alkyl halides.

The chemical behavior of cyclic di-p-xylylenes represented by the structural formula:

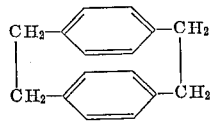

cannot usually be predicted on the basis of reactions normally attributed to aromatic compounds. The unpredictability has been attributed to the close proximity of the aromatic nuclei with resultant electronic interaction between the $\pi$-electrons of the two aromatic rings. In addition, the aromatic nuclei of such compounds are distorted from their normal planar configurations giving rise to a strained and somewhat sterically hindered molecule. Molecules possessing such abnormal configurations could well be expected to lead to atypical reactions.

The unpredictable nature of cyclic di-p-xylylene has been further substantiated by Cram and Allinger (J. Am. Chem. Soc., 77, 6289 (1955)) whose attempts to reduce the diazonium salt of mono-amino-di-p-xylylene by conventional methods proved unsuccessful, whereas 2,5-disubstituted anilines, the simple aromatic counterpart of the cyclic dimer, can easily be reduced to the corresponding hydrocarbons using the identical reagents which were ineffective with the cyclic dimer. Cram and Allinger also found themselves limited to monosubstitution of di-p-xylene apparently due to the blocking effect of a substituent on one ring essentially protecting both rings from further substitution.

Thus it can be seen that while substitution of di-p-xylylene is known, all typical aromatic reactions cannot simply be associated with the cyclic dimer due to the lack of planarity of the aromatic rings and the resulting electronic interaction between the rings. Also, polysubstitution of di-p-xylylene has heretofore been hindered due to the stereo-chemical consequences resulting from the physical structure of the molecule.

It is therefore an object of the present invention to provide a novel method for the cyanation of cyclic di-p-xylylene having up to 6 cyano groups substituted on the aromatic nuclei.

Now in accordance with the present invention, cyanated di-p-xylylenes having the general structure

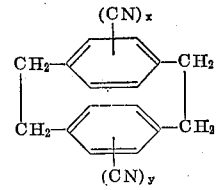

wherein $x$ is a number from 1 to 3, inclusive, and $y$ is a number from 0 to 3, inclusive, can be prepared by contacting a halogenated di-p-xylylene having the general structure

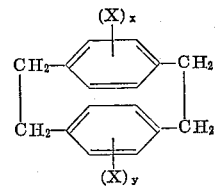

wherein $x$ is a number from 1 to 3, inclusive, and $y$ is a number from 0 to 3, inclusive, and X is a halogen, with cuprous cyanide, in an inert atmosphere and under essentially anhydrous conditions and at sufficient temperatures to cause the replacement of the halogen substituents on the di-p-xylylene by cyano groups. By this route, it is now possible to prepare cyanated di-p-xylylene having from 1 to 6 cyano groups on the aromatic nuclei of the cyclic dimer.

Conventional cyanation techniques applicable to the cyanation of aryl halides as described hereinbefore have been found to be unsatisfactory with the cyclic di-p-xylyene and instead, quite contrary to normal reactivity considerations, direct cyanation of halogenated di-p-xylylene with cuprous cyanide has been found to be successful.

The halogenated starting material can be conveniently prepared by contacting the cyclic dimer, di-p-xylylene with free halogen such as chlorine or bromine in the presence of a Friedel-Crafts catalyst, such as the halides of boron, aluminum, zinc, iron, titanium, and tin and preferably the halides of such metals corresponding to the free halogen employed. If desired, and as a convenient technique, it is possible to prepare the catalyst in situ during the reaction by the use of the free metal. For example, the use of catalytic quantities of iron powder, in a mixture of the di-p-xylylene and the free chlorine or bromine, will react to form ferric chloride or bromide which serves as the catalyst in the reaction. Equivalent results can be secured, however, by using the metal halide or other Friedel-Crafts catalyst initially.

The reaction is most conveniently conducted in an inert diluent such as carbon tetrachloride, methylene chloride or bromide and like inert solvents which are themselves halogenated or which can be readily halogenated themselves in the reaction, but which are inert to the di-p-xylylene and do not hinder or prevent the reaction. The use of bromine dissolved in the solvent selected for the reaction makes it easy to control the reaction and facilitates determination of addition rates of the bromine. Gaseous chlorine can be used with equal ease.

While the reaction readily proceeds without need for additional heat, it is often desirable to hasten the reaction by mild heating, to as high as 80° C. although it is possible to conduct the reaction at temperatures as low as 0° C. if desired. After apparent reaction is terminated as evidenced by vapor phase chromatographic analysis of samples taken periodically during the addition of bromine to the reaction mixture or simply noting the acceptance of the stoichiometric proportions of bromine by the reaction system, the brominated products can be recovered after filtering off the catalyst, by concentrating the reaction mass by distillation and thereafter causing the crystallization or precipitation of the brominated di-p-xylylene by cooling of the reaction medium. The brominated product can be readily recovered by filtration and purified by sublimation.

By careful control of the amount of bromine added, the degree of bromination can be regulated to give brominated products of relatively pure form, and substantially free of large amounts of the other brominated products. For example, a mixture of monobromo and dibromo di-p-xylylene can readily be separated due to the divergence of melting points, i.e., monobromo di-p-xylylene having a melting point of 132°–134° C. and dibromo di-p-xylylene having a melting point of 245°–246° C., by such convenient means as fractional distillation.

In converting the halogenated starting material to the corresponding cyanated di-p-xylylene, the amount of cuprous cyanide employed is not narrowly critical, but should be present in an amount of at least one mole of the cyanide per atom of halogen substituent on the di-p-xylylene molecule. For instance, one mole of cuprous cyanide is required per mole of monochloro or monobromo di-p-xylylene whereas two moles of the cyanide are required per mole of dichloro or dibromo di-p-xylylene, and so forth. It is generally preferred to use 20% to 50% excess of the cuprous cyanide based on the required stoichiometric proportions of reactants. Even greater amounts are not seriously deleterious to the process.

Temperature conditions for the reaction are quite critical, however, and within much narrower bounds. If during the course of the reaction the temperature should rise much above 240° C., for example 250° C. or above, considerable tar formation would result. At temperatures much below 200° C., for example 180° C., the reaction proceeds extremely slowly. Small amounts of a suitable inert solvent can be added to the reaction mixture to facilitate the temperature control. At the preferred temperatures, i.e., 200° C. to 240° C., the reaction is essentially completed within about 5 to 20 hours.

A solvent which is high boiling, inert to the reactants and products, and nitrogenic is preferable for a more uniform reaction but is not considered essential to the reaction per se. Examples of such solvents which can be used are quinoline, pyridine, a quinoline-pyridine mixture, dimethylformamide, and tetrahydrofuran. Neither of the reactants need to be soluble in the selected solvent in order to effect the reactions as solubility does not seem to be controlling factor. With certain of the lower boiling solvents, such as pyridine and dimethylformamide, pressures above atmospheric are desirable so that reaction conditions can be maintained. However, pressure is not a critical factor in this process.

It has been found however, that the reaction should be carried out under anhydrous conditions, using anhydrous solvents and a dry inert atmosphere. It is important that the reaction mixture be protected from moisture in order to avoid any side reactions. The inert atmosphere may consist of any dry inert gas, preferably nitrogen. It is preferable to use atmospheric or super-atmospheric pressures because of the difficulty encountered in temperature control under reduced pressures. By the use of higher pressures, lower boiling solvents can be successfully employed in the reaction mixture.

After the reaction period has been completed, the product can be conveniently isolated by contacting the reaction mass with a mixture of a suitable solvent for the cuprous halide formed in the reaction and the excess cuprous cyanide such as aqueous ammonium hydroxide, aqueous ferric chloride, sodium cyanide, or ethylene diamine, and a suitable solvent for the cyanated di-p-xylylene such as benzene. After agitating the mixture to dissolve all particles, the organic layer containing the cyanated product can be separated from the aqueous layer. Isolation of the product from the organic layer can be accomplished by fractional distillation and if desired a subsequent recrystallization from a suitable solvent for the cyanated di-p-xylyene may be undertaken to yield a very pure cyanated product. However, such recrystallization is not necessary for most practical purposes.

The cyanated di-p-xylylenes appear as highly crystalline solids which are insoluble in water and cold alcohol but will dissolve in such hot organic solvents as benzene, toluene, and ethanol. Infrared spectral analysis shows a high absorption at a wavelength of 4.5 microns indicative of the presence of cyano groups. The melting point of mono-cyano-di-p-xylylene has been found to be 117°–118.5° C. while dicyano-di-p-xylylene has been found to have a melting point of 165.5–167° C.

It has been found that the cyanated di-p-xylylenes of the present invention can be successfully utilized in polymer formation by pyrolyzing the cyanated di-p-xylylene having the general formula:

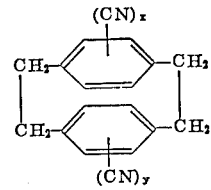

wherein $x$ is a number from 1 to 3, inclusive, and $y$ is a number from 0 to 3, inclusive, to form a vaporous diradical having the structure:

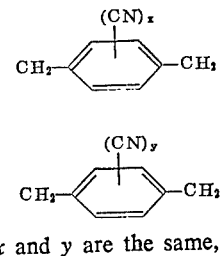

Thus, where $x$ and $y$ are the same, two moles of the same cyano-p-xylylene diradical are formed, and when condensed yield the homopolymer of the cyano-p-xylylene. When they are different, either homopolymers or copolymers can be secured as hereinafter set forth.

In the polymerization process, the vaporous diradicals condense and polymerize nearly instantaneously at the condensation temperature of the diradicals. The coupling of these diradicals involves such low activation energy and the chain propagation shows little or no preference as to the particular diradical, that steric and electronic effects are not important as they are in vinyl polymerization. Thus these cyanated homopolymers can be made by cooling the vaporous diradical down to any temperature below the condensation temperature of the diradical. It has been observed that for each diradical species, there is a definite ceiling condensation temperature above which the diradical will not condense and polymerize. All observed ceilings of substituted p-xylylene diradicals have been below 200° C. but vary to some degree upon the operating pressure involved. For example, at 0.5 mm.

Hg pressure, the following condensation and polymerization ceilings are observed for the following diradicals.

| | |
|---|---|
| p-Xylene | ° C— 25–30 |
| Chloro-p-xylylene | ° C— 70–80 |
| Cyano-p-xylylene | ° C— 120–130 |
| n-Butyl-p-xylylene | ° C— 130–140 |
| Iodo-p-xylylene | ° C— 180–200 |

Thus, by this process, homopolymers are made by maintaining the initial condensation and polymerization zone at a temperature below the ceiling condensation temperature of the particular diradical specie involved, or desired in the homopolymer. This is most appropriately termed "homopolymerizing conditions."

Where several different diradical existing in the pyrolyzed mixture have different vapor pressure and condensation characteristics, as for example p-xylylene, or cyano-p-xylylene and dicyano-p-xylylene or any other mixture with other substituted diradicals, homopolymerization will result when the condensation and polymerization temperature is selected to be at or below that temperature where only one of the diradicals condense and polymerize. Thus, for purposes within this application, the terms "under homopolymerization conditions" are intended to include those conditions where only homopolymers are formed. Therefore it is possible to make homopolymers from a mixture containing one or more of the substituted diradicals when any other diradicals present have different condensation or vapor pressure characteristics, and wherein only one diradical specie is condensed and polymerized in only one polymerization zone. Of course, other diradical species not condensed in this zone can be passed through said zone in vaporous form to be condensed and polymerized in a subsequent polymerization zone.

Inasmuch as p-xylylene diradicals for example are condensed at temperatures about 25° to 30° C., which is much lower than the cyano p-xylylene diradicals, i.e., about 120° to 130° C. it is also possible to have present such diradicals in the vaporous pyrolyzed mixture along with the cyano-substituted diradicals of this invention. In such a case, homopolymerizing conditions are secured by maintaining the initial polymerization zone at a temperature below the ceiling condensation temperature of the substituted p-xylylene but above that of the p-xylylene, thus permitting the p-xylylene vapors to pass through the initial polymerization zone without condensating and polymerizing but collecting the poly-p-xylylene is a subsequent polymerization zone.

It is also possible to obtain cyanated copolymers through the pyrolysis process hereinabove described. Copolymers of p-xylylene and cyanated p-xylylene diradicals, copolymers of cyanated di-p-xylylene and other different substituted p-xylylene diradicals, as well as copolymers of cyanated p-xylylene diradicals wherein the substitutent groups are all cyano radicals but each diradical containing a differing number of substitutent groups can all be obtained through said pyrolysis process.

Copolymerization occurs simultaneously with condensation upon cooling of the vaporous mixture of reactive diradicals to a temperature below 200° C. under polymerization conditions.

Copolymers can be made by maintaining the initial condensation and polymerization zone at a temperature below the ceiling condensation temperature of the lowest boiling diradical desired in the copolymer, such as at room temperature or below. This is considered "copolymerizing conditions," since at least two of the diradicals will condense and copolymerize in a random copolymer at such temperature.

In the pyrolytic process, the reactive diradicals are prepared by pyrolyzing the cyanated di-para-xylylene at a temperature less than about 700° C., and preferably at a temperature between about 550° C. to about 600° C. At such temperatures, essentially quantitative yields of the reactive diradical are secured. Pyrolysis of the starting di-p-xylylene begins at about 450° C. regardless of the pressure employed. Operation in the range of 450°–550° C. serves only to increase time of reaction and lessen the yield of polymer secured. At temperatures above about 700° C., cleavage of the substituent group can occur, resulting in a tri- or poly-functional species causing crosslinking or highly branched polymers.

Pyrolysis temperature is essentially independent of the operating pressure. It is however preferred that reduced or sub-atmospheric pressures be employed. For most operations, pressures within the range of 0.0001 to 10 mm. Hg are most practical. However if desired, greater pressures can be employed. Likewise if desirable, inert vaporous diluents such as nitrogen, argon, carbon dioxide, steam and the like can be employed to vary the optimum temperautre of operation or to change the total effective pressure in the system.

The polymers can be readily recovered from the polymerization zone by any convenient means, depending on the particular zone employed. Where a cold surface such as a condenser is employed as the polymerization zone, the polymer can be removed from the wall of the zone by mechanically stripping or dissolving it off with a solvent. Condensation of the diradical in a water sprayer or under the surface of an aqueous medium recovers the polymer in particulate form, which can then be separated by filtration and drying by conventional means prior to fabrication.

In the polymerization, it is also possible to control the molecular weight of the polymers by control over the particular condensation conditions. It has been discovered for instance that within relatively narrow ranges of temperature changes of the polymerization zone that surprising changes in molecular weight of the homopolymers can be secured, provided that all such temperatures are below the condensation temperature of the p-xylylene species.

Actual molecular weight, i.e. the number of repeating units of the cyano-p-xylylene in the polymer chain, has been difficult to determine, however, it can range from 10 to 10,000 and above with the most desirable polymers being those averaging from 100 to 5000 units in the chain.

The following examples are cited to illustrate the invention and are not intended to limit it in any manner. All percentages and parts are by weight unless otherwise indicated.

*Example I*

A mixture consisting of 20.8 grams of di-p-xylylene, 0.1 grams of iron powder and 2 liters of methylene chloride was placed in a three-necked flask, equipped with a reflux condenser, stirrer, and addition funnel. A solution of 16 grams of bromine in 100 ml. of carbon tetrachloride was added dropwise from this addition funnel to the stirred suspension over a 30 minute period. The reaction mixture was stirred an additional 15 minutes. 500 cc. of water was added to the reaction mixture and stirring was continued for an additional 15 minutes. The organic layer was separated and filtered and thereafter concentrated to dryness. The material was purified by sublimation. A total of 25 grams equivalent to 87.2% yield was obtained. The material had a melting point of 132°–134° C. Vapor phase chromatographic analysis showed the product to contain 93.6% monobromo di-p-xylylene.

In a dry 100 ml. triple-necked flask fitted with a reflux condenser (protected from moisture with a drying tube), a thermometer, and a dry nitrogen inlet, was placed 5.0 grams of the monobromo di-p-xylylene as prepared above, 3.0 grams of cuprous cyanide, and 20 ml. of dry quinoline. The reaction mixture was heated to 210°–230° C. for about 20 hours with continuous stirring. After the reaction period, the mixture was cooled to about 100° C. and poured into a mixture of 100 ml. each of benzene and a 29% aqueous solution of ammonium hydroxide. The concentration was half that of the commercially available aqueous ammonium hydroxide (58%). The mixture was shaken well until all the course particles disintegrated.

The benzene layer was separated, washed with dilute aqueous ammonium hydroxide, water, and then filtered. After concentrating the benzene solution to dryness, the crude solid residue was distilled under vacuum to give the crystalline product.

The distilled product was recrystallized from 95% ethanol to give a yield of 85% of the analytically pure product having a melting point of 117°–118.5° C. A mixed melting point determination using the distilled product and a sample of pure monocyano di-p-xylylene as determined by elemental analysis showed no depression. Identical infrared spectra was obtained by analysis of both samples. No bromine was detected.

*Example II*

A mixture consisting of 5 grams of di-p-xylylene, 0.1 gram of iron powder and 400 ml. of carbon tetrachloride was placed in a three-necked flask, equipped with a reflux condenser, stirrer, and addition funnel. A solution of 10 grams of bromine in 50 ml. of carbon tetrachloride was added dropwise from this addition funnel to the stirred suspension over a 30 minute period. The reaction mixture was stirred at 10° C. to 20° C. for twelve hours. The catalyst was filtered off and the solution concentrated to 30 ml. by distillation. Upon cooling, di-bromo-di-p-xylylene crystallized from solution. The material was separated by filtration, and purified by sublimation. A total of 3.3 grams equivalent to 37% yield was obtained. The material had a melting point of 240° C.–242° C. The material analyzed for 43.5% bromine, as compared with the theoretical value of 43.7% for di-bromo-di-p-xylylene, having the structure:

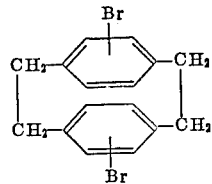

Into a dry 100 ml. three-necked flask fitted with a reflux condenser protected from moisture with a drying tube, a thermometer, and a dry nitrogen-gas inlet was placed 7.32 g. of the dibromo di-p-xylylene as prepared above, 4.5 g. of dry cuprous cyanide and 20 ml. of dry quinoline. The mixture was heated at 210° C. to 230° C. for 20 hours with continuous stirring. After the reaction period, the mixture was cooled to about 100° C. and poured into a mixture of 100 ml. each of benzene and a 29% aqueous solution of ammonium hydroxide. The concentration was half that of the commercially available aqueous ammonium hydroxide (58%). The mixture was shaken well until all the coarse particles disintegrated. The benzene layer was separated, washed with dilute aqueous ammonium hydroxide, water, and then filtered. After concentrating the benzene solution to dryness, the crude solid residue was distilled under vacuum to give a slightly colored crystalline product. The color is due to traces of quinoline.

The distilled product was recrystallized from 95% ethanol to give an analytically pure product having a melting point of 160° C. to 167° C. and in a yield of 81%. Elemental analysis confirmed the structure—

Calculated for $C_{18}H_{14}N_2$: C, 83.72; H, 5.43; N, 10.85. Found: C, 83.45; H, 5.70; N, 10.50. No bromine was detected.

*Example III*

In the distillation zone of a two zone-distillation-pyrolyzation furnace was placed 3.0 grams of dicyano-di-p-xylylene. The material was distilled at 0.01 mm. Hg pressure over a twelve minute period through the pyrolysis zone of the furnace which was maintained at 660° C. The polymerization was conducted on the inner surface of a glass cylinder, which was maintained at room temperature, to form a tough, transparent poly-(cyano-p-xylylene) film.

The cylindrical film was removed at the end of the run and was found to be insoluble in refluxing carbon tetrachloride. It had the structure

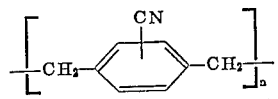

Samples of the film subjected to physical testing showed a melting point of 260° C., tensile strength of 8,700 p.s.i. and a tensile modulus of 435,000 p.s.i. with an elongation at break of 7–12 percent. Therefore, poly(cyano-p-xylylene) may be classified as a high-melting, tough, solvent-resistant polymer.

Pyrolysis of the mono-cyano-di-p-xylylene under the same conditions as above, yields a tough, solvent-resistant random copolymer of p-xylylene and cyano-p-xylylene having the structure

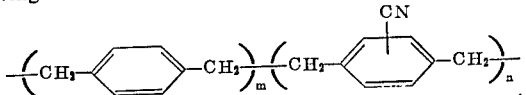

The polymers formed by the pyrolytic polymerization have been found to be extremely good surface deactivators. This is largely due to the strong electrophilic deactivating power of the cyanide radical itself. The polymers are also readily employed in solution or melt forming applications and are particularly desirable in films, fibers, surface coatings, electrical insulation, and other similar applications, particularly where high resistance to thermal and chemical deterioration is necessary.

What is claimed is:
1. A composition of matter having the structure:

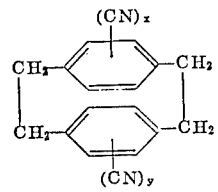

wherein $x$ has a value of from 1 to 3, inclusive, and $y$ is a number from 1 to 3, inclusive.
2. Dicyano-di-p-xylylene.

References Cited in the file of this patent
UNITED STATES PATENTS

| | | |
|---|---|---|
| 1,692,417 | Pongratz | Nov. 20, 1928 |
| 2,195,076 | Braun et al. | Mar. 26, 1940 |

FOREIGN PATENTS

| | | |
|---|---|---|
| 861,898 | Great Britain | Mar. 1, 1961 |